United States Patent [19]

Neal

[11] 3,986,138

[45] Oct. 12, 1976

[54] ISOTHERMAL GAS DYNAMIC LASER NOZZLE

[75] Inventor: John W. Neal, North Palm Beach, Fla.

[73] Assignee: The United States of America as represented by the Secretary of the Air Force, Washington, D.C.

[22] Filed: Mar. 29, 1974

[21] Appl. No.: 456,406

[52] U.S. Cl. .................. 331/94.5 P; 331/94.5 D; 330/4.3; 165/105; 60/267
[51] Int. Cl.² .................. H01S 3/04; H01S 3/095; H01S 3/22
[58] Field of Search .................. 331/94.5; 330/4.3; 165/105; 60/267

[56] References Cited
UNITED STATES PATENTS
3,759,443 9/1973 Freggens .................. 60/267

OTHER PUBLICATIONS

Meinzer, AIAA Paper No. 71-25, AIAA 9th Aero-Space Sciences Meeting, N.Y., N.Y., Jan. 25-27, 1971 pp. 1-8.
Eastman, Scientific American, vol. 218, No. 5, May 1968, p. 46.

Primary Examiner—Robert J. Webster
Attorney, Agent, or Firm—Joseph E. Rusz; Arsen Tashjian

[57] ABSTRACT

The inventive laser comprises two identical hollow nozzle portions which are positioned in layered fashion (i.e., in stacked condition), in registration, and with their respective longitudinal axes in parallel. Each nozzle portion has a protrusion extending into the void or hollow interior, and coolant flow passages are located in the protrusion. The internal surface of each nozzle portion has a nickel fiber wick sintered to it, and the wick is saturated with a metal, preferably sodium, which is in a liquid state. The unique structure of the inventive nozzle permits a very short transient start and also permits operation of the nozzle at steady-state conditions in an isothermal manner.

2 Claims, 4 Drawing Figures

ISOTHERMAL GAS DYNAMIC LASER NOZZLE

BACKGROUND OF THE INVENTION

This invention relates to the gas laser art and, more particularly, to a novel isothermal gas dynamic laser nozzle and constituent nozzle portions thereof.

It is fair and accurate to state that gas lasers (including those sometimes referred to as "chemical" lasers or "chemically pumped" lasers) are not as well known as other types of lasers. It is also fair and accurate to state that, as a result of their comparatively more recent advent, gas lasers have not attained the hopefully desired degree of sophistication, when compared with solid state lasers, for example. With regard to rapid starting gas dynamic lasers (hereinafter referred to as GDL) devices, it is well known in the art that this particular type of gas laser has several severe inherent disadvantages. These disadvantages will be discussed later herein for the benefit of those not in the gas laser art. Suffice it to say at this juncture that what is needed as to these GDL devices, and what is not presently available, is a nozzle for these devices which will provide a very short start transient (i.e., the surface temperatures over the entire nozzle will reach the steady-state operating values very rapidly after application of the combustion environment), and which said nozzle will operate at steady-state conditions in an almost completely isothermal manner.

I have invented a novel nozzle and constituent identical nozzle portions thereof which meet these requirements and fulfill these needs. Thereby, I have significantly advanced the state-of-the-art.

SUMMARY OF THE INVENTION

This invention pertains to a unique isothermal GDL nozzle and to constituent nozzle portions thereof which are identical to each other.

The principal object of this invention is to teach a novel GDL nozzle and constituent nozzle portions thereof which will provide a very short start transient (as described above) and which will operate at steady-state conditions in an isothermal manner.

This principal object, and other equally important and related objects, of my invention will become readily apparent after a consideration of the description of the inventive isothermal GDL nozzle and constituent nozzle portions thereof, coupled with reference to the drawings.

FURTHER DISCUSSION OF THE PRIOR ART

Figure 1:
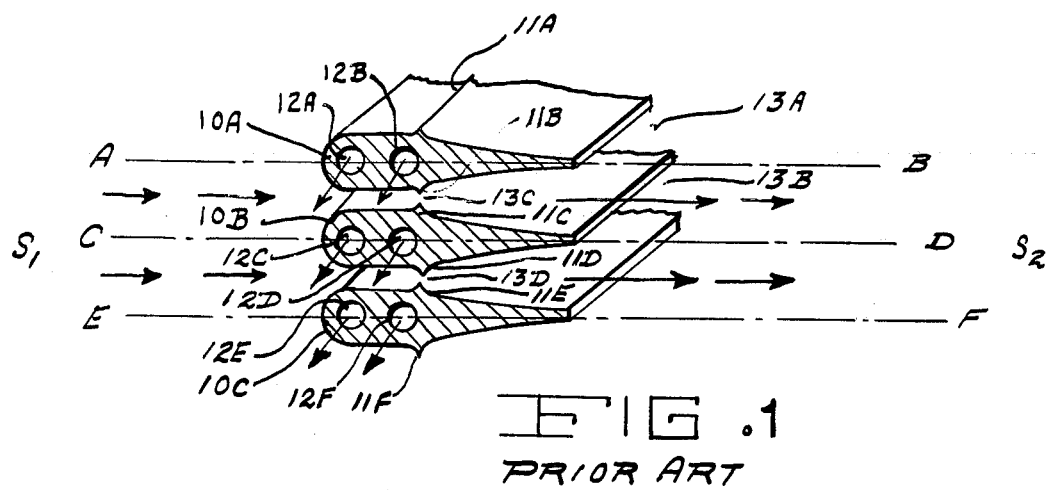
FIG. 1 is side elevation view, partially in cross-section, and in simplified pictorial form, of three identical conventional (i.e., "prior art") GDL nozzle portions which are positioned to form two nozzles.

With reference to FIG. 1, therein are shown a plurality (i.e., three) prior art GDL laser nozzle portions 10A, 10B and 10C which are so positioned that they form the two nozzles 13A and 13B. As can be seen from FIG. 1, nozzle portions 10A, 10B and 10C are identical, with the upper external surface of each also identical to the respective and corresponding lower external surface thereof; are in layered fashion (i.e., are stacked); and, are in registration. Although nozzle portions 10A and 10B are positioned to form one nozzle (i.e., 13A), it is obvious of course that nozzle portion 10A could have been positioned with identical nozzle portion 10C to form, for example, the equivalent of nozzle 13B. Also, the longitudinal axes A-B, C-D and E-F of, respectively, nozzle portions 10A, 10B and 10C are, obviously, parallel. Each nozzle portion 10A, 10B and 10C has an upper and a lower nozzle throat flare. More specifically, nozzle portion 10A has upper nozzle throat flare 11A and lower nozzle throat flare 11B; nozzle portion 10B has upper nozzle throat flare 11C and lower nozzle throat flare 11D; and, nozzle portion 10C has upper nozzle throat flare 11E and lower throat nozzle flare 11F. Lower nozzle throat flare 11B of 10A and upper nozzle throat flare 11C of 10B are in spaced apart relationship; of course, do not abut; and form nozzle throat 13C. In a similar spaced apart relationship are lower nozzle throat flare 11D of 10B and upper nozzle throat flare 11E of 10C, that form nozzle throat 13D. Each nozzle portion 10A, 10B and 10C is solid, except for a plurality of coolant flow passages which run transversely of the longitudinal axis of its respective nozzle portion. For example, coolant flow passages 12A and 12B of nozzle portion 10A run transversely of longitudinal axis A-B. Similarly, coolant flow passages 12C and 12D run transversely of longitudinal axis C-D; and coolant flow pasages 12E and 12F run transversely of longitudinal axis E-F.

The structure and relative positioning of the prior art GDL nozzle portions 10A, 10B and 10C is based upon the conventional approach to cooling GDL nozzles, such as 13A and 13B. That approach has severe inherent disadvantages, as alluded to hereinbefore. Briefly, these disadvantages are as follows. Firstly, the combustion heat transfer to the nozzle portion, such as either 10A or 10B, is typically about 100 times greater on the subsonic side $S_1$ than on the supersonic side $S_2$ of the nozzle throat, such as throat 13C of nozzle 13A, and throat 13D of nozzle 13B. This results in the supersonic side $S_2$ of the nozzle portion heating up very slowly during the start of the device, whereas the subsonic side $S_1$ comes to a steady-state condition very rapidly. Secondly, after reaching steady-state operating condition, the temperature profile of the typical prior art nozzle surface will vary considerably from the throat plane out into the supersonic side of the nozzle. Thirdly, these two severe inherent disadvantages cause the additional severe disadvantages of: (a) inducing high thermal stresses in the part; and, (b) inhibiting the performance of the GDL device as a whole because of the effect of the rapidly changing wall temperatures on the nozzle boundary layer thickness.

DESCRIPTION OF A PREFERRED EMBODIMENT

Figure 2:
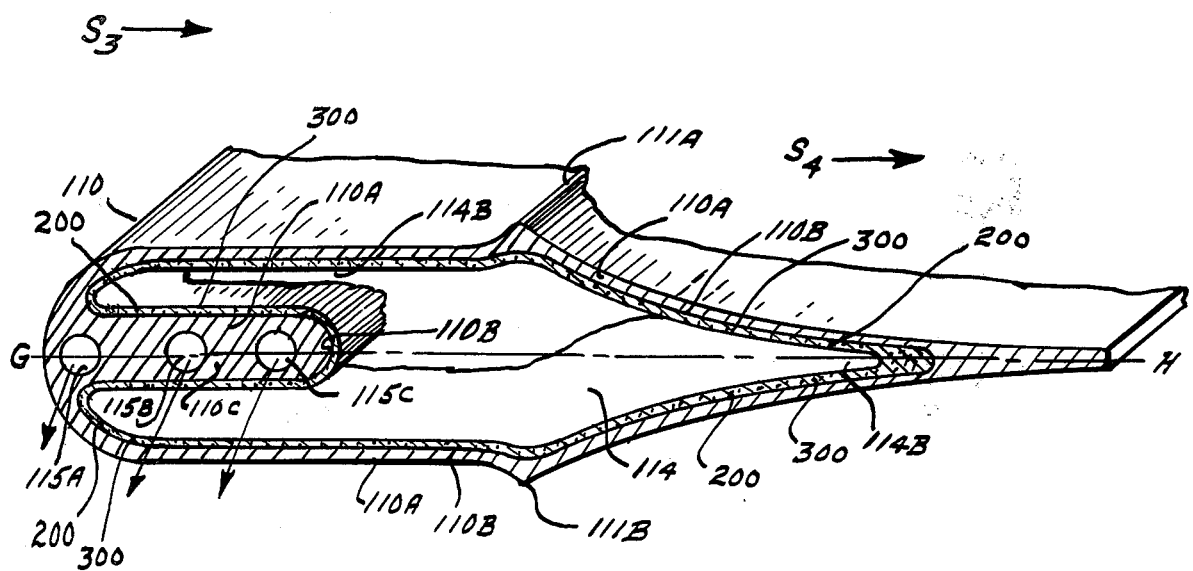
FIG. 2 is a side elevational view of a preferred embodiment of one of a pair of identical GDL nozzle portions which constitute my inventive nozzle, with said one portion being shown partially fragmented, partially in cross section, partially in pictorial form, and partially in simplified schematic form; and, FIGS. 3 and 4 show the one portion of my inventive GDL nozzle which was shown in FIG. 2, but in selected fragmented form to better illustrate the manner of its operation and of the operation of the nozzle of which it is a portion.

With reference to FIG. 2, therein is shown a preferred embodiment 110 of a representative one of a pair of unique identical GDL nozzle portions which constitute my novel nozzle. The representative nozzle portion 110 has a longitudinal axis G-H; the upper external surface and the lower external surface are identical; and, the nozzle portion 110 is hollow, with the void therein generally designated by reference numeral 114. The void (or cavity) 114 is limited and defined by wall 110A which has internal surface 110B; and, said void 114 has an aft end (i.e., an upstream end) 114A and a fore end (i.e., a downstream end) 114B. My nozzle portion 110 also has an upper nozzle throat flare 111A, a lower nozzle throat flare 111B, and a forwardly disposed wall protrusion 110C at the aft end 114A of the void 114. A plurality of coolant flow passages, such as 115A, 115B and 115C are located within wall protrusion 110C and are positioned transversely of the nozzle portion longitudinal axis G-H. A wick of nickel fiber 200 is sintered to the internal surface 110B of wall 110A (including wall protrusion 110C) of nozzle portion 110. The wick 200 is filled with a suitable metal 300, in a liquid state or form, preferably sodium. My inventive nozzle comprises, as previously stated, two nozzle portions which are identical to each other (and identical to representative nozzle portion 110), with said two nozzle portions positioned in a layered fashioned (i.e., in a stacked condition), in registration, and with their respective longitudinal axes in parallel.

Also shown in FIG. 2 are directional arrows which indicate the direction of flow of the subsonic combustion gas $S_3$ and the supersonic conbustion gas $S_4$, assuming of course that GDL nozzle portion 110 is the lower portion of the GDL nozzle of which it 110 is a component.

MANNER OF OPERATION OF THE PREFERRED EMBODIMENT

The manner of operation of the preferred embodiment 110, FIG. 2, can best be described by reference to FIGS. 3 and 4.

As a preliminary matter, it is to be noted that my invention operates in two general modes and that both modes are based upon the "heat pipe principle".

Figure 3:
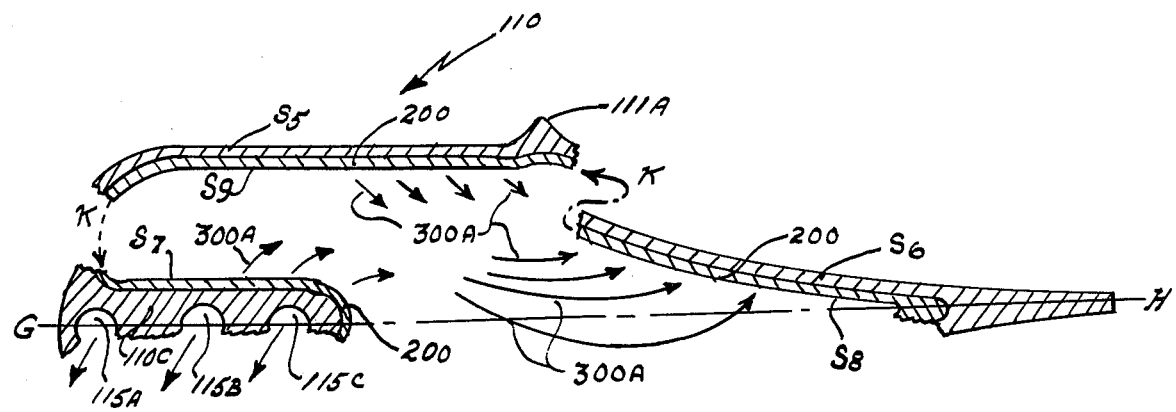

With reference to FIG. 3, the first mode is a start transient where the cold nozzle (which, of course, is formed and is defined by two of my identical nozzle portions, such as 110) is suddenly exposed to subsonic combustion gas. More specifically and more accurately, the cold subsonic nozzle surface, such as $S_5$, of each of the nozzle portions, such as 110, is suddenly exposed to subsonic combustion gas. The feature of the invention in this mode is to rapidly bring the supersonic nozzle surface $S_6$ to a steady-state temperature.

What occurs during this first mode is, sequentially, as follows. Firstly, the coolant gas which is flowing in the coolant flow passages, such as 115A, 115B and 115C, starts out at a higher temperature than the ambient protrusion 110C, which is preferably of metal, thereby causing surface $S_7$ (of wick 200 filled with liquid metal 300) to act as, and to be, an evaporator which evaporates the liquid metal 300, with the metal vapor 300A flowing towards and to surface $S_8$ (of wick 200 filled with liquid metal 300). Then, the subsonic surface $S_5$ heats up rapidly due to high combustion gas heat flux, causing surface $S_9$ also to be an evaporator which evaporates the liquid metal 300, with the metal vapor 300A flowing therefrom to surface $S_8$. Next, the supersonic surface $S_6$ heats up relatively slowly, causing wick surface $S_8$ to act as, and to be, a condenser. The condensing vapor transfers large amounts of heat to surface $S_8$, thus heating it up rapidly. Then, capillary action (symbolically indicated by directional arrows designated "K") returns the condensed liquid metal 300 via wick 200 to the evaporator surfaces $S_9$ and $S_7$. Thereby, the supersonic nozzle portion surface $S_6$ is brought rapidly to a steady-state temperature.

Figure 4:
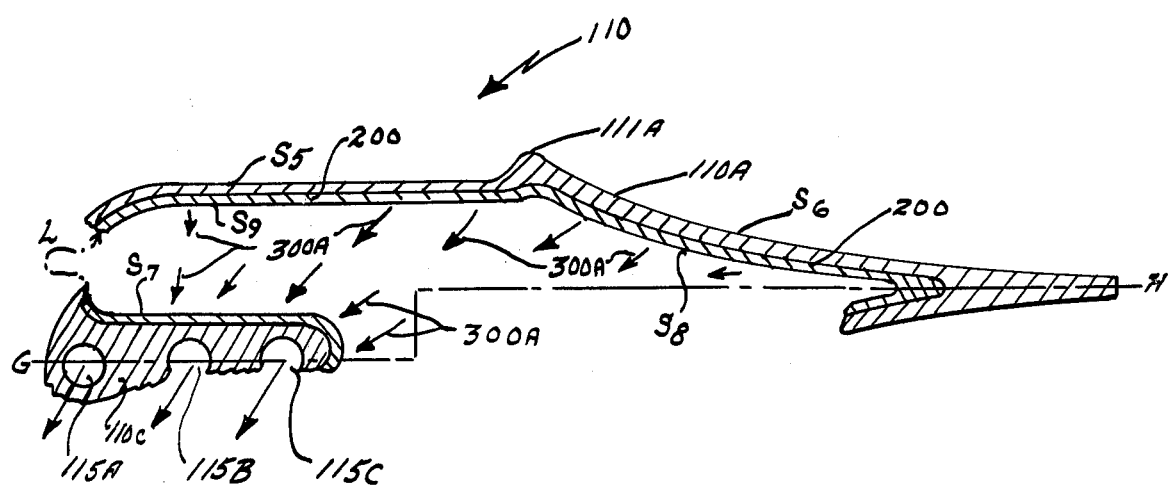

With reference to FIG. 4, the second mode occurs when steady-state heat transfer conditions are achieved. In this second mode the feature of the invention is a nozzle exterior surface which operates in an isothermal manner.

What occurs during this second mode is, sequentially, as follows. Firstly, wick surfaces $S_8$ and $S_9$ become evaporators, when the steady-state temperatures are reached. These wick surfaces $S_8$ and $S_9$ operate at a constant temperature which is the saturation temperature of the vapor 300A of the liquid metal 300. The external subsonic surface $S_5$ and supersonic surface $S_6$ therefore operate approximately at constant temperature, differing only by the thermal gradients across the wall 110A. Then, the coolant gas flowing through coolant flow passages, such as 115A, 115B and 115C, absorbs the heat of vaporization, thereby causing surface $S_7$ to become a condenser. Surface $S_7$ temperature operates at the saturation temperature also, and is thus equal to the temperature of surfaces $S_8$ and $S_9$. Next, capillary pumping (symbolically indicated by directional arrow "L") returns the condensed liquid metal 300 to evaporator surfaces $S_8$ and $S_9$, via wick 200.

CONCLUSION

It is abundantly clear from all of the foregoing, and from the drawings herein, that the stated principal object and other related and desirable objects, such as the reduction of thermal stresses which would otherwise be induced by nozzle temperature variation and such as the resultant increase in life span of the nozzle, have been attained.

It is to be noted that, although there have been described the fundamental and unique features of my invention as applied to a preferred embodiment, various other embodiments, substitutions, additions, omissions, adaptations, and the like, will occur to and can be made by those of ordinary skill in the art, without departing from the spirit of my invention. For example, alternative structuring of my invention can include change in location and/or difference of configuration of wall protrusion 110C and of surface $S_7$.

What is claimed is:

1. An isothermal gas dynamic laser nozzle comprising two identical hollow nozzle portions, with each said nozzle portion having a longitudinal axis, and an internal surface which has a sintered nickel fiber wick attached thereto that is saturated with a metal in a liquid state, and a void with a fore end and an aft end, with said aft end having a forwardly disposed protrusion in which a plurality of coolant flow passages are located and which said coolant flow passages are transversely positioned in relationship to said longitudinal axis, and with each said nozzle portion so dimensioned and so configurated that, when said two identical hollow portions are positioned in layered fashion, and in registration, and with their respective longitudinal axes in parallel, the nozzle is formed, limited and defined.

2. An isothermal gas dynamic laser nozzle, as set forth in claim 1, wherein said metal in a liquid state is sodium.

* * * * *